United States Patent
Chaudhary

(10) Patent No.: US 11,535,731 B2
(45) Date of Patent: Dec. 27, 2022

(54) PEROXIDE CONTAINING POLYOLEFIN FORMULATION

(71) Applicant: Dow Global Technologies LLC, Midland, MI (US)

(72) Inventor: Bharat I. Chaudhary, Princeton, NJ (US)

(73) Assignee: DOW GLOBAL TECHNOLOGIES LLC, Midland, MI (US)

(*) Notice: Subject to any disclaimer, the term of this patent is extended or adjusted under 35 U.S.C. 154(b) by 445 days.

(21) Appl. No.: 16/623,858

(22) PCT Filed: Aug. 27, 2018

(86) PCT No.: PCT/US2018/048085
§ 371 (c)(1),
(2) Date: Dec. 18, 2019

(87) PCT Pub. No.: WO2019/046159
PCT Pub. Date: Mar. 7, 2019

(65) Prior Publication Data
US 2020/0181374 A1    Jun. 11, 2020

Related U.S. Application Data

(60) Provisional application No. 62/551,998, filed on Aug. 30, 2017.

(51) Int. Cl.
| | |
|---|---|
| C08K 5/00 | (2006.01) |
| C08K 5/14 | (2006.01) |
| C08L 23/06 | (2006.01) |
| C08L 23/08 | (2006.01) |
| C08L 23/12 | (2006.01) |
| C08L 23/14 | (2006.01) |
| H01B 3/44 | (2006.01) |

(52) U.S. Cl.
CPC ............ *C08L 23/06* (2013.01); *C08K 5/005* (2013.01); *C08K 5/14* (2013.01); *C08L 23/0815* (2013.01); *C08L 23/0869* (2013.01); *C08L 23/12* (2013.01); *C08L 23/14* (2013.01); *H01B 3/44* (2013.01); *C08L 2203/20* (2013.01)

(58) Field of Classification Search
CPC .......... C08L 23/04; C08L 23/06; C08L 23/08; C08F 10/02; C08F 110/02; C08F 210/02; C08J 3/24; C08J 3/243; C08J 3/244; C08J 2323/04; C08J 2323/06; C08J 2323/08
See application file for complete search history.

(56) References Cited

U.S. PATENT DOCUMENTS

| | | | |
|---|---|---|---|
| 2,930,083 A | 3/1960 | Vostovich et al. | |
| 4,018,852 A | 4/1977 | Schober | |
| 5,266,627 A | 11/1993 | Meverden et al. | |
| 5,346,961 A | 9/1994 | Shaw et al. | |
| 5,530,072 A | 7/1996 | Shirodkar | |
| 5,614,592 A | 3/1997 | van Drunen et al. | |
| 6,187,423 B1 | 2/2001 | Maeger et al. | |
| 2004/0127628 A1 | 7/2004 | Walton et al. | |
| 2007/0249743 A1 | 10/2007 | Sehanobish et al. | |
| 2009/0159129 A1 | 6/2009 | Kataoka et al. | |

FOREIGN PATENT DOCUMENTS

| | | |
|---|---|---|
| EP | 2468813 | 6/2012 |
| WO | 2016200600 | 12/2016 |
| WO | 2016204949 | 12/2016 |

OTHER PUBLICATIONS

Chaudhary et al., Nitroxyls for Scorch Suppression, Cure Control, and Functionalization in Free-Radical Crosslinking of Polyethylene, Polymer Engineering and Science, 2007.
Chopin et al., Nitroxyls for Scorch Suppression, Cure Control,and Functionalization in Free-RadicalCrosslinking of Polyethylene, Polym. Eng. Sci., 2007, 47, 50-61.
Dow Endurance HFDC-4202 EC Datasheet, Low Density Polyethylene, 2017, The Dow Chemical Company.
Enhanced Performance TR-XLPE for MV Cables, The Dow Chemical Company.
Free Radical Initiators, Polymer Products from Aldrich, pp. 3-4.
Functional Chemicals & Polymers, Organic Peroxides, 2016, NOF Corporation.
Ghosh et al., Reactive Melt Processing of Polyethylene: Effect of Peroxide Action on Polymer Structure, Melt Rheology and Relaxation Behaviour, Polymer, 1997, vol. 38, No. 25, p. 6175-6180.
Initiators and Reactor Additives for Thermoplastics, Akzo Nobel.
Kim et al., Effect of Peroxide Modification on Melt Fracture of Linear Low Density Polyethylene during Extrusion, Polymer Journal, 1999, vol. 31, No. 17, pp. 579-584.
Lachtermacher et al., Reactive Processing of LLPEs in Counterrotating Nonintermeshing Twin-Screw Extruder. III. Methods of Peroxide Addition, 1996, Journal of Applied Polymer Science, vol. 59, pp. 1775-1785.
Lachtermacher et al., Reactive Processing of LLDPEs in Corotating Intermeshing Twin-Screw Extruder. I. Effect of Peroxide Treatment on Polymer Molecular Structure, Journal of Applied Polymer Science, vol. 58, 2077-2094.
Liu et al., Conversion Polymer measurement in polyethylene/peroxide coupling system under steady shear flow , 2005, 46, 7605-7611.

(Continued)

*Primary Examiner* — Irina S Zemel
*Assistant Examiner* — Jeffrey S Lenihan

(57) ABSTRACT

A process of melt compounding a polyolefin formulation comprising a ethylenic-based (co)polymer, an antioxidant, and from 0.15 to 1.00 weight percent of an organic peroxide having a 1-hour half-life temperature of less than or equal to 155 degrees Celsius (° C.) and/or a 10-hour half-life temperature of less than or equal to 135° C. Also, intermediate compositions having a modified rheology and crosslinked polyolefin products made therefrom; methods of making and using same; and articles containing same.

8 Claims, No Drawings

(56) References Cited

OTHER PUBLICATIONS

Liu et al., Selectivity of Shear Rate on Chains in Polymer Combination Reaction, J Appl Polym Sci, 2006, 100, 839-842.
Milani et al., A Combined Experimental-Numerical Rheometric and Mechanical Characterization of EPM/EPDM Rubber for Medium Voltage Cable Applications Vulcanized with Peroxides, Journal of Applied Polymer Science, 2014, 131, 8, 40075.
Parmar et al., Rheological and Molecular Properties of Organic Peroxide Induced Long Chain Branching of Recycled and Virgin High-Density Polyethylene Resin, Polym. Eng. Sci., 2009, vol. 49, p. 1806-1813.
Perez et al., Rheological study of linear high density polyethlenes modified with organic peroxide, Polymer, 2002, 43, 2711-2720.
Ramos et al., Study of low concentrations of dicumyl peroxide on the molecular structure modification of LLDPE by reactive extrusion, Polymer Testing, 2004, 23, 949-955.
Rawlins et al., Polymer Grafting and Crosslinking, 2009, p. 47.
Richardson, Recent Developments in MV Cable Materials, 2015, 16th Annual Electric Operations Technical & Leadership Summit.
Rubber Composition used for power cable accessories—contg. Polyolefin, organic peroxide(s) with different half-life temps., and opt. crosslinking agent, calcium carbonate and/or graphite, Mitsubishi Cable Ind Ltd., 1996.
Tasanatanachai et al., Rheological Modification of LLDPE through Reactive Processing with Peroxide, Polymer Processing and Polymer Nanomaterials Research Unit.

PEROXIDE CONTAINING POLYOLEFIN FORMULATION

FIELD

The field includes polyolefin formulations, products made therefrom, methods of making and using same, and articles containing same.

INTRODUCTION

U.S. Pat. No. 2,930,083 to J. E. Vostovich, et al. relates to extrusion of cross-linked polyethylene and process of coating wire thereby.

U.S. Pat. No. 5,614,592 to R. van Drunen, et al. relates to a filler-free peroxide masterbatch and process for making it.

Y. C. Kim and K. S. Yang published *Effect of Peroxide Modification on Melt Fracture of Linear Low Density Polyethylene during Extrusion*, Polymer Journal, 1999, volume 31, number 17, pages 579-584.

EP 2 468 813 A1 by P. Nylander ("Nylander") relates to a scorch resistant polyethylene composition. Specifically a cross-linkable polyethylene composition, comprising (i) an unsaturated polyethylene having a total amount of carbon-carbon double bonds/1000 carbon atoms of at least 0.1, and (ii) a cross-linking agent mixture comprising a first and a second peroxide, wherein the first peroxide has a 10-hour-half-life-temperature which is 1 to 10 degrees Celsius higher than that of the second peroxide, and wherein said first peroxide is present in an amount of at least 8 wt % based on the total amount of the first and second peroxide of the cross-linking agent mixture. Nylander seeks to avoid premature crosslinking during extrusion [0061].

G. Milani, et al. published *A Combined Experimental-Numerical Rheometric and Mechanical Characterization of EPM/EPDM Rubber for Medium Voltage Cable Applications Vulcanized with Peroxides*, Journal of Applied Polymer Science, 2014, COI: 10.1002/APP.40075.

SUMMARY

We recognized problems that hurt the performance of melt extrusions of prior peroxide-containing polyolefin formulations (melts), such as melt extrusions of coatings for wires and power cables. Prior compositions may have zero-shear viscosities that are too low and/or low-strain extensional viscosities that are too low during melt extrusion, thereby undesirably leading to coatings that sag before they can be crosslinked in a continuous vulcanization (CV) tube. Problems are magnified if the polyethylene is an elastomer designed for making flexible crosslinked polyolefin products such as flexible electrical insulation for use in wire and cable applications. Such polyethylene elastomers typically are synthesized with a molecular catalyst such as a metallocene or post-metallocene catalyst and are linear polymers of relatively narrow molecular weight distributions. Only polymers of high molecular weights (and high shear viscosities) adequately resist sag until the coatings can be crosslinked. These problems plague other processes that mix and shape melts of prior polyolefin formulations, such as injection molding processes.

A technical solution to this problem is not obvious from the prior art. Inventiveness is necessary to discover a new polyolefin formulation that, when melted and mixed, exhibits a heretofore conflicting combination of low shear viscosity/low shear-induced heating and high zero-shear viscosity and/or high low-strain extensional viscosity/no sag. Ideally such a composition and process would work in the presence of one or more additives such as antioxidant, coagent, tree retardant, hindered amine stabilizer, and/or filler.

Our technical solution includes a process of melt compounding a polyolefin formulation comprising an ethylenic-based (co)polymer, an antioxidant, and from 0.15 to 1.00 weight percent (wt %) of an organic peroxide having a 1-hour half-life temperature of less than or equal to 155 degrees Celsius (° C.) and/or a 10-hour half-life temperature of less than or equal to 135° C., when measured according to the Half-Life Temperature Test Method described later. During melt compounding (i.e., mixing a melt of) the polyolefin formulation, the temperature of the melt is chosen such that the rheology (e.g., viscosity) of the polyolefin formulation is modified in the presence of the antioxidant without curing the polyolefin formulation. This melt compounding allows, if desired, subsequent extrusion of the resulting rheology-modified melt of the polyolefin formulation to give an intermediate composition that has a sufficiently modified rheology (e.g., modified melt viscosity) that prevents sag until it can be crosslinked. Our technical solution also includes intermediate compositions and cross-linked polyolefin products made therefrom; methods of making and using same; and articles containing same.

The inventive polyolefin formulations and products are useful in any application in which polyethylenes are utilized, including castings, coatings, extrusions, films, laminates, molded articles, and sheets.

DETAILED DESCRIPTION

The Summary and Abstract are incorporated here by reference.

The organic peroxide of the polyolefin formulation may have a 1-hour half-life temperature of at least 30° C. and/or a 10-hour half-life temperature of at least 25° C., when measured according to the Half-Life Temperature Test Method, described later.

During melt compounding (e.g., heating and optionally mixing) of the polyolefin formulation, the organic peroxide may be substantially decomposed to give a first intermediate composition that has a modified rheology (e.g., modified melt viscosity) that enables shaping thereof for a particular end use whilst preventing sag thereof until the first intermediate composition can be crosslinked. For example, the first intermediate composition may be contacted with a second organic peroxide to give a second intermediate composition, which may be extruded as a coating on a conductive core (e.g., wire), and the coating/conductor may be cured in a vulcanization operation in a CV tube to give a power cable comprising the conductive core and a coating of the crosslinked polyolefin product thereon.

The inventive polyolefin formulation, intermediate compositions, and/or crosslinked polyolefin products may have at least one improved property relative to a comparative composition or product that was not rheology modified. The improved property(ies) may be increased melt zero shear viscosity prior to curing and/or increased ultimate degree of crosslinking. Ultimate degree of crosslinking is the maximum extent of coupling of a given ethylenic-based (co)polymer that can be achieved under curing conditions employed such as irradiating versus peroxide/heating, peroxide composition and amount, and temperature.

Certain inventive embodiments are described below as numbered aspects for easy cross-referencing. Additional embodiments are described elsewhere herein.

Aspect 1. A method of chemically modifying a polyolefin formulation in such a way as to modify melt viscosity thereof without completely curing the polyolefin formulation, which comprises, prior to the chemical modification, from 60 to 99.45 weight percent (wt %) of (A) an ethylenic-based (co)polymer composition consisting essentially of an ethylenic-based (co)polymer or a combination of the ethylenic-based (co)polymer and a polypropylene polymer (50 to 100 wt %, alternatively 75 to 100 wt %, alternatively 95 to 100 wt % propylene comonomeric units), with the proviso that the polypropylene polymer is from 0 to <40 wt % of the polyolefin formulation; from 0.05 to less than 2.00 wt % of (B) an antioxidant; and from 0.15 to 1.00 weight percent (wt %) of (C) a first organic peroxide having a 1-hour half-life temperature of less than or equal to 155° C. and/or a 10-hour half-life temperature of less than or equal to 135° C., when measured according to the Half-Life Temperature Test Method, described later; wherein all weight percents are based on total weight of the polyolefin formulation; the method comprising heating a melt of the polyolefin formulation, which has been kept at a temperature less than 160.0° C., to a temperature of greater than or equal to 160.0° C., thereby substantially decomposing the (C) first organic peroxide in the melt so as to chemically modify melt viscosity of the polyolefin formulation to give a first intermediate composition having a melt viscosity that is greater than the melt viscosity of the polyolefin formulation, all without completely curing the polyolefin formulation or the first intermediate composition; wherein the melt of the polyolefin formulation comprises a melt of the (A) ethylenic-based (co)polymer composition in contact with the (B) antioxidant and the (C) first organic peroxide, with the proviso that the polyolefin formulation prior to and during the heating step is free of (D) a second organic peroxide, which may be the same as or different than the (C) first organic peroxide. In some aspects the polyolefin formulation prior to the heating step contains from 0.16 to 0.99 wt % of (C), alternatively from 0.20 to 0.60 wt % of (C), alternatively from 0.25 to 0.45 wt % of (C). The wt % amounts of constituents (A) to (C) in the polyolefin formulation are the total amounts thereof immediately prior to the heating step. The heating step may further include mixing the melt of the (A) in contact with the (B) and (C) and/or mixing the first intermediate composition. The polyolefin formulation may be free of polyolefins other than constituent (A).

Aspect 2. The method of aspect 1 further comprising contacting the first intermediate composition with from 0.05 to 3.0 wt % of (D) a second organic peroxide having a 1-hour half-life temperature of less than or equal to 155° C. and/or a 10-hour half-life temperature of less than or equal to 135° C., when measured according to the Half-Life Temperature Test Method, described later, to give a second intermediate composition comprising the first intermediate composition and the (D) second organic peroxide, which is the same as or different than the (C) first organic peroxide. The method may further comprise cooling the first intermediate composition to a temperature less than 160.0° C. prior to the contacting step of aspect 2.

Aspect 3. The method of aspect 1 or 2 further comprising shaping the first intermediate composition or second intermediate composition to give a shaped form composed of the first intermediate composition or second intermediate composition, respectively. In some aspects the shaping comprises coating, drawing, extruding, molding, or pressing the first or second intermediate composition and the shaped form made thereby comprises a coating, a drawn article, an extruded article, a molded article, or a pressed article. In some aspects the shaping comprises hot extrusion of coatings of the first or second intermediate composition on conductive cores, such as wires, as may be done during manufacturing of power cables. Temperature used for hot extrusion of such coatings for making power cables may be from 130° to 150° C. Extrusion conditions may also include die dimensions and extrusion rates. In some aspects the shaping of the first or second intermediate composition comprises extruding the first or second intermediate composition to give an extruded form thereof, respectively.

Aspect 4. The method of aspect 2 or 3, further comprising curing the second intermediate composition to give a cross-linked polyolefin product. This step involves heating for long enough at a sufficiently high temperature (typically greater than or equal to 150° C.) in order to substantially decompose the (D) second organic peroxide.

Aspect 5. The method of any one of aspects 1 to 4 further comprising a preliminary step (before the heating step) comprising melting a solid form (e.g., powder, pellets, or a shaped article) of the (A) ethylenic-based (co)polymer composition so as to give a melt of the (A) ethylenic-based (co)polymer composition. The melting step may be conducted in the presence of the (B) antioxidant and/or (C) first organic peroxide such that the melt of the (A) ethylenic-based (co)polymer composition is formed in contact with the (B) antioxidant and (C) first organic peroxide, and may be used as such in the heating step. Alternatively, the melting step may be conducted in the absence of the (B) antioxidant and/or (C) first organic peroxide such that the melt of the (A) ethylenic-based (co)polymer composition is formed free of (not in contact with) the (B) antioxidant and/or (C) first organic peroxide. In aspects wherein the melt of the (A) ethylenic-based (co)polymer composition is formed free of the (B) antioxidant and/or (C) first organic peroxide, the method further comprises a step of contacting the melt of the (A) ethylenic-based (co)polymer composition that is free of the (B) antioxidant and/or (C) first organic peroxide with the (B) antioxidant and/or (C) first organic peroxide, as the need may be, so as to give the melt of the (A) ethylenic-based (co)polymer composition in contact with the (B) antioxidant and (C) first organic peroxide, as may used as such in the heating step.

Aspect 6. The method of any one of aspects 1 to 5 described by any one of limitations (i) to (v): (i) the ethylenic-based (co)polymer is a polyethylene homopolymer; (ii) the ethylenic-based (co)polymer is an ethylene/alpha-olefin copolymer comprising 50 to 99.0 wt % ethylenic monomeric units and 50 to >0 wt % ($C_3$-$C_{20}$)alpha-olefin-derived comonomeric units; (iii) the ethylenic-based (co)polymer is ethylene/unsaturated carboxylic ester copolymer comprising from 51 to 99.0 wt % ethylenic monomeric units and from 49 to 1.0 wt % unsaturated carboxylic ester comonomeric units; (iv) the ethylenic-based (co)polymer composition consists essentially of the ethylenic-based (co)polymer of any one of (i) to (iii); and (v) the ethylenic-based (co)polymer composition consists essentially of a combination of the ethylenic-based (co)polymer any one of (i) to (iii) and the polypropylene polymer.

Aspect 7. The method of any one of aspects 1 to 6 wherein the (B) antioxidant is a hindered phenol, a sulfur-functional compound, a phosphite, a phosphonite, a polyamine, or a combination of any two or more thereof.

Aspect 8. The method of any one of aspects 1 to 7 further characterized by any one of limitations (i) to (xx): (i) the (C) first organic peroxide has a 10-hour half-life temperature that is less than or equal to 110.0° C. and/or a 1-hour half-life temperature that is less than or equal to 130.0° C.; (ii) the (C)

first organic peroxide has a 10-hour half-life temperature that is greater than 110.0° C. and/or a 1-hour half-life temperature that is greater than 130.0° C.; (iii) the (D) second organic peroxide has a 10-hour half-life temperature that is less than or equal to 110.0° C. and/or a 1-hour half-life temperature that is less than or equal to 130.0° C.; (iv) the (D) second organic peroxide has a 10-hour half-life temperature that is greater than 110.0° C. and/or a 1-hour half-life temperature that is greater than 130.0° C.; (v) both (i) and (iii); (vi) both (i) and (iv); (vii) both (ii) and (iii); (viii) both (ii) and (iv); (ix) the 1-hour half-life temperature of the (C) first organic peroxide is at least 10.0° C., alternatively at least 11° C., alternatively at least 13° C., alternatively at least 15° C., alternatively at least 17° C., alternatively at least 20.0° C. higher than the 1-hour half-life temperature of the (D) second organic peroxide; (x) the 10-hour half-life temperature of the (C) first organic peroxide is at least 10.0° C., alternatively at least 11° C., alternatively at least 13° C., alternatively at least 15° C., alternatively at least 17° C., alternatively at least 20.0° C. higher than the 10-hour half-life temperature of the (D) second organic peroxide; (xi) the 10-hour half-life temperature of the (C) first organic peroxide is from greater than 110.0° to 120° C., alternatively from greater than 111° to 119° C., alternatively from greater than 111° to 117° C.; (xii) the 1-hour half-life temperature of the (C) first organic peroxide is from greater than 130.0° to 140° C., alternatively from greater than 131° to 139° C., alternatively from greater than 131° to 136° C.; (xiii) both (xi) and (xii); (xiv) the (C) first organic peroxide is dicumyl peroxide; (xv) the (C) first organic peroxide is 2,5-dimethyl-2,5-di(tert-butylperoxy) hexane; (xvi) the 10-hour half-life temperature of the (D) second organic peroxide is from greater than 110.0° to 120° C., alternatively from greater than 111° to 115° C., alternatively from greater than 111° to 113° C.; (xvii) the 1-hour half-life temperature of the (D) second organic peroxide is from greater than 130.0° to 140° C., alternatively from greater than 131° to 135° C., alternatively from greater than 131° to 133° C.; (xviii) both (xvi) and (xvii); (xix) the (D) second organic peroxide is dicumyl peroxide; (xix) both (xiv) and (xix); (xx) both (xv) and (xix).

Aspect 9. The method of any one of aspects 1 to 8 wherein the polyolefin formulation further comprises at least one additive selected from (chosen from): from 0.05 to <2.0 wt % of (E) an alkenyl-functional coagent; from 0.05 to <2.0 wt % of (F) a tree retardant (e.g., a water tree retardant); from 0.05 to <2.0 wt % of (G) a hindered amine stabilizer; and from 0.05 to <10.0 wt % of (H) a calcined clay filler; with the proviso that the total amount of the polyolefin formulation is 100 wt %. In some aspects the polyolefin formulation does not comprise the polypropylene polymer and comprises the (E) alkenyl-functional coagent; (F) tree retardant; (G) hindered amine stabilizer; and (H) calcined clay filler. In some aspects the polyolefin formulation comprises the polypropylene polymer; (E) alkenyl-functional coagent; (F) tree retardant; (G) hindered amine stabilizer; and (H) calcined clay filler. In embodiments wherein the total wt % of (A) to (D) is less than 100 wt %, the polyolefin formulation further comprises at least one additive such as constituents (E) to (H). In all aspects the total weight of the polyolefin formulation is 100.00 wt %.

Aspect 10. A first intermediate composition prepared by the method of any one of aspects 1 to 9.

Aspect 11. A second intermediate composition prepared by the method of aspect 2 and comprising from 93.0 to 99.5 wt % of the first intermediate composition; from 0.50 to 5.0 wt % of the (D) second organic peroxide; and from 0 to less than 2.0 wt % of (E) alkenyl-functional coagent. In some aspects the second intermediate composition is prepared by the method of any one of aspects 3 to 9 when depending from aspect 2.

Aspect 12. A crosslinked polyolefin product made by the method of aspect 4. In some aspects the crosslinked polyolefin product is made by the method of any one of aspects 5 to 9 when depending from aspect 4.

Aspect 13. A manufactured article comprising a shaped form comprising the first intermediate composition of aspect 10, the second intermediate composition of aspect 11, the crosslinked polyolefin product of aspect 12, or a combination of any two or more thereof. In some aspects the manufactured article is selected from: coatings, films, sheets, and injection molded articles. E.g., coatings of power cables, agricultural film, food packaging, garment bags, grocery bags, heavy-duty sacks, industrial sheeting, pallet and shrink wraps, bags, buckets, freezer containers, lids, and toys.

Aspect 14. A coated conductor comprising a conductive core and a coating layer at least partially surrounding the conductive core and comprising the manufactured article of aspect 13.

Aspect 15. A method of conducting electricity, the method comprising applying a voltage across the conductive core of the coated conductor of aspect 14, thereby generating a flow of electricity through the conductive core.

Any numbered aspect may be amended by any one limitation of a later Example.

The term "coagent" means a compound that enhances crosslinking, i.e., a curing coagent. Typical coagents are acyclic or cyclic compounds that contain carbon atoms in their respective backbone or ring substructure. Thus, the backbone or ring substructure of the conventional coagent is based on carbon (carbon-based substructure).

The term "(co)polymer" is a condensed form of "homopolymer or copolymer". A homopolymer is a macromolecule composed of monomeric units derived from only one monomer and no comonomer. A copolymer is a macromolecule or collection of macromolecules having monomeric units, made by polymerizing a monomer, and one or more different types of comonomeric units, made by polymerizing one or more different comonomers. Monomers and comonomers are polymerizable molecules. A monomeric unit, also called a monomer unit or "mer", is the largest constitutional unit contributed by (derived from) a single monomer molecule to the structure of the macromolecule(s). A comonomeric unit, also called a comonomer unit or "comer", is the largest constitutional unit contributed by (derived from) a single comonomer molecule to the structure of the macromolecule(s). Each unit is typically divalent. A "bipolymer" is a copolymer made from a monomer and one comonomer. A "terpolymer" is a copolymer made from a monomer and two different comonomers. An ethylenic-based copolymer is such a copolymer wherein the monomeric units are derived from the monomer ethylene ($CH_2=CH_2$) and comprise on average per molecule, at least 50 weight percent, and the comonomeric units are derived from one or more comonomers described herein and comprise on average per molecule, from >0 to at most 50 weight percent, of the macromolecules.

The terms "curing" and "crosslinking" are used interchangeably herein to mean forming a crosslinked product (network polymer).

The term "ethylenic-based (co)polymer" means a macromolecule containing from 50 to 100 wt % repeat units derived from $H_2C=CH_2$ and from 50 to 0 wt %, respectively, of one or more comonomers selected from ($C_3$-$C_{20}$) alpha-olefins, vinyl acetate, and alkyl acrylates and being free of a polypropylene polymer. The ethylenic-based (co) polymer may be a polyethylene homopolymer having 100 wt % ethylenic monomeric units and 0 wt % comonomeric units or an ethylene/comonomer copolymer having >50 to <100 wt % ethylenic monomeric units and >0 to <50 wt %, alternatively 1 to <50 wt %, alternatively 5 to <50 wt % comonomeric units.

The terms "lower" and "higher" modifying the expression "temperature decomposing organic peroxide" are relative to each other.

The term "(meth)acrylate" includes acrylate, methacrylate, and a combination thereof. The (meth)acrylate may be unsubstituted.

As described above, rheology of the intermediate composition (e.g., first intermediate composition), in melt form, is modified relative to rheology of the polyolefin formulation, in melt form, from which it is made. The relative extent of rheology modification may be characterized by the Dynamic Oscillatory Shear Viscosity Test Method and/or the Extensional Viscosity Test Method and/or the Zero Shear Viscosity Test Method, described later. In some aspects the characterization is by the Dynamic Oscillatory Shear Viscosity Test Method and/or the Zero Shear Viscosity Test Method, alternatively the Dynamic Oscillatory Shear Viscosity Test Method and its V100 and/or V0.1/V100 test values measured at 135° C. For comparison purposes, the characterization may be performed on embodiments of the polyolefin formulation consisting of constituents (A), (B), and (C), and embodiments of the first intermediate composition prepared therefrom. For comparison purposes, the characterization may be performed after subjecting the embodiments of the polyolefin formulation consisting of constituents (A), (B), and (C) to rheology modification at a given melt mixing temperature (e.g., 135° C.) for a time period calculated to be equal to at least six times (6×) or more of the half-life of the (C) first organic peroxide, wherein for calculating the time period (not for doing the rheology modification) the half-life of (C) is measured in dodecane at that temperature (e.g., 135° C.), thereby giving the first intermediate composition, which is rheology modified. The time period may be calculated to be equal to at least 6×, alternatively at least 12 times (12×), alternatively at least 18 times (18×) the half-life of the (C) in dodecane at that temperature; and at most 60 times (60×), alternatively at most 45 times (45×), alternatively at most 30 times (30×) the half-life of the (C) in dodecane at that temperature. For an additional or alternative comparison, the polyolefin composition may be compared with the second intermediate composition by also characterizing embodiments of the second intermediate composition consisting of the first intermediate composition prepared as in the foregoing sentence and constituent (D).

The extent of thermally irreversible bonds formed between molecules of the polyolefin formulation to give the (first) intermediate composition is measurably less than the extent of thermally irreversible bonds formed between molecules of the (first) intermediate composition to give the crosslinked polyolefin product. This difference may be characterized by the Gel Content Test Method, described later. In general, the higher the gel content the greater the extent of thermally irreversible bonds formed between molecules, and vice versa. The (first) intermediate composition may have a gel content (insoluble fraction) of from 0% to less than (<) 40%, alternatively from 0% to <30%, alternatively from 0% to <20%, alternatively from 0% to <10%, alternatively from 0% to <5%, alternatively from 0% to <1%, alternatively from greater than (>) 0% to less than (<) 40%, alternatively from >0% to <30%, alternatively from >0% to <20%, alternatively from >0% to <10%, alternatively from >0% to <5%, alternatively from >0% to <1%. In some aspects the (first) intermediate composition may have a minimum gel content of 0%, alternatively 0.01%, alternatively 0.05%, alternatively 0.1%. The crosslinked polyolefin product may have a gel content (insoluble fraction) of from greater than or equal to (≥) 40% to 100%, alternatively from ≥50% to 100%, alternatively from ≥60% to 100%, alternatively from ≥70% to 100%, alternatively ≥40% to <100%, alternatively from ≥50% to <100%, alternatively from ≥60% to <100%, alternatively from ≥70% to <100%. In some aspects the crosslinked polyolefin product may have a maximum gel content of 99%, alternatively 95%, alternatively 90%. The foregoing gel contents are characterized by the Gel Content Test Method.

The constituent (A) ethylenic-based (co)polymer composition: a single phase or multiphase, uniform or non-uniform, continuous phase or discontinuous phase, crosslinkable macromolecule composed of repeat units made from ethylene monomer and optionally one or more olefin-functional comonomers, wherein the macromolecule has a backbone consisting essentially of, or consisting of carbon atoms, or a collection of such crosslinkable macromolecules, which yield a network structure upon being crosslinked. The (A) may be a polyethylene homopolymer containing repeat units derived from ethylene or an ethylene/alpha-olefin interpolymer, also referred to as a copolymer, containing repeat units derived from ethylene and repeat units derived from an alpha-olefin comonomer, which is different than ethylene. Interpolymer includes bipolymers, terpolymers, etc.

The (A) ethylenic-based (co)polymer composition may be a polyethylene homopolymer containing 99 to 100 wt % ethylenic monomeric units. The polyethylene homopolymer may be high density polyethylene (HDPE) homopolymer made by coordination polymerization or a low density polyethylene (LDPE) homopolymer made by radical polymerization.

Alternatively, The (A) ethylenic-based (co)polymer composition may be an ethylene/alpha-olefin copolymer containing 50 to <100 wt % ethylenic monomeric units and 50 to 0 wt % ($C_3$-$C_{20}$)alpha-olefin-derived comonomeric units. The ethylene/alpha-olefin copolymer embodiment of (A) ethylene/alpha-olefin copolymer may be a linear low density polyethylene (LLDPE), medium density polyethylene (MDPE), or high density polyethylene (HDPE). Alternatively, the polyolefin polymer may be a low density polyethylene (LDPE). The ethylene/alpha-olefin ("α-olefin") interpolymer having an α-olefin content of at least 1 wt %, at least 5 wt %, at least 10 wt %, at least 15 wt %, at least 20 wt %, or at least 25 wt % based on the entire interpolymer weight. These interpolymers can have an alpha-olefin content of less than 50 wt %, less than 45 wt %, less than 40 wt %, or less than 35 wt % based on the entire interpolymer weight. Illustrative ethylene/α-olefin interpolymers are ethylene/propylene, ethylene/1-butene, ethylene/1-hexene, ethylene/1-octene, ethylene/diene containing from 20 to 1 wt % diene comonomeric units, ethylene/propylene/1-octene, ethylene/propylene/1-butene, ethylene/1-butene/1-octene, ethylene/propylene/diene (EPDM) containing 50 to 100 wt % ethylene monomeric units, 49 to >0 wt % of propylene comonomeric units, and 20 to 1 wt % diene comonomeric units. The diene used to make the diene comonomeric units in the ethylene/diene copolymer or in EPDM independently may be 1,3-butadiene, 1,5-hexadiene, 1,7-octadiene, ethylidene norbornene, dicyclopentadiene, vinyl norbornene, or a combination of any two or more thereof.

The $(C_3-C_{20})$alpha-olefin of the ethylene/alpha-olefin copolymer aspect of the (A) ethylenic-based (co)polymer composition may be a compound of formula (I): $H_2C=C(H)-R$ (I), wherein R is a straight chain $(C_1-C_{18})$alkyl group. $(C_1-C_{18})$alkyl group is a monovalent unsubstituted saturated hydrocarbon having from 1 to 18 carbon atoms. Examples of R are methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, and octadecyl. In some embodiments the $(C_3-C_{20})$alpha-olefin is 1-propene, 1-butene, 1-hexene, or 1-octene; alternatively 1-butene, 1-hexene, or 1-octene; alternatively 1-butene or 1-hexene; alternatively 1-butene or 1-octene; alternatively 1-hexene or 1-octene; alternatively 1-butene; alternatively 1-hexene; alternatively 1-octene; alternatively a combination of any two of 1-butene, 1-hexene, and 1-octene. Alternatively, the alpha-olefin may have a cyclic structure such as cyclohexane or cyclopentane, resulting in an α-olefin such as 3-cyclohexyl-1-propene (allyl cyclohexane) and vinyl cyclohexane. The $(C_3-C_{20})$alpha-olefin may be used as a comonomer with ethylene monomer.

The (A) ethylenic-based (co)polymer composition may consist essentially of the crosslinkable ethylene/unsaturated carboxylic ester copolymer or the combination of the crosslinkable ethylene/unsaturated carboxylic ester copolymer and a polypropylene polymer.

The crosslinkable ethylene/unsaturated carboxylic ester copolymer embodiment of the copolymer embodiment of the ethylenic-based (co)polymer of the (A) ethylenic-based (co)polymer composition is made by copolymerizing ethylene monomer and at least one unsaturated carboxylic ester comonomer. Each unsaturated carboxylic ester comonomer may independently have hydrogen atoms and from 3 to 20 carbon atoms per molecule, i.e., be a $(C_3-C_{20})$ unsaturated carboxylic ester comonomer. In some aspects the unsaturated carboxylic ester comonomer may be a vinyl $(C_2-C_8)$ carboxylate and the crosslinkable ethylene/unsaturated carboxylic ester copolymer is an ethylene—vinyl $(C_2-C_8)$ carboxylate copolymer, which may have a vinyl $(C_2-C_8)$ carboxylate comonomeric content from >0 to <3.5 wt %, alternatively from >0 to 3.0 wt %, alternatively from >0 to 2.0 wt %, alternatively from 0.5 to 2.0 wt % based on total weight of the ethylene—vinyl $(C_2-C_8)$carboxylate copolymer. In some aspects the vinyl $(C_2-C_8)$carboxylate is a vinyl ester of a carboxylic acid anion having from 2 to 8 carbon atoms, alternatively 2 to 4 carbon atoms. The vinyl $(C_2-C_8)$ carboxylate may be a vinyl $(C_2-C_4)$carboxylate such as vinyl acetate, vinyl propionate, or vinyl butanoate and the crosslinkable ethylene/unsaturated carboxylic ester copolymer may be an ethylene-vinyl $(C_2-C_4)$carboxylate bipolymer, alternatively an ethylene-vinyl acetate (EVA) bipolymer, alternatively an ethylene-vinyl propionate bipolymer, alternatively an ethylene-vinyl butanoate bipolymer. The EVA bipolymer consists essentially of ethylene-derived monomeric units and vinyl acetate-derived comonomeric units. The vinyl acetate comonomeric unit content of the EVA bipolymer may be from >0 to <3.5 wt %, alternatively from >0 to 3.0 wt %, alternatively from >0 to 2.0 wt %, alternatively from 0.5 to 2.0 wt % based on total weight of the EVA bipolymer. The wt % values are on average per molecule of the EVA. Alternatively or additionally, the (A) (e.g., EVA bipolymer) may have a melt index (190° C., 2.16 kg) of from 2 to 60 g/10 min., alternatively 5 to 40 g/10 min. measured according to ASTM D1238-04.

In some aspects the unsaturated carboxylic ester comonomer used to make the crosslinkable ethylene/unsaturated carboxylic ester copolymer embodiment of the copolymer embodiment of the ethylenic-based (co)polymer of the (A) ethylenic-based (co)polymer composition may be a $(C_1-C_8)$ alkyl (meth)acrylate and the crosslinkable ethylene/unsaturated carboxylic ester copolymer is an ethylene—$(C_1-C_8)$ alkyl (meth)acrylate copolymer (EAA), which may have a $(C_1-C_8)$alkyl (meth)acrylate comonomeric content from >0 to <3.5 wt %, alternatively from >0 to 3.0 wt %, alternatively from >0 to 2.0 wt %, alternatively from 0.5 to 2.0 wt %, based on total weight of the ethylene-$(C_1-C_8)$alkyl (meth) acrylate copolymer. In some aspects the $(C_1-C_8)$alkyl may be a $(C_1-C_4)$alkyl, $(C_5-C_8)$alkyl, or $(C_2-C_4)$alkyl. The EAA consists essentially of ethylene-derived monomeric units and one or more different types of $(C_1-C_8)$alkyl (meth) acrylate-derived comonomeric units such as ethyl acrylate and/or ethyl methacrylate comonomeric units. The $(C_1-C_8)$ alkyl may be methyl, ethyl, 1,1-dimethylethyl, butyl, or 2-ethylhexyl. The (meth)acrylate may be acrylate, methacrylate, or a combination thereof. The $(C_1-C_8)$alkyl (meth) acrylate may be ethyl acrylate and the EAA may be ethylene-ethyl acrylate copolymer (EEA) or the $(C_1-C_8)$alkyl (meth)acrylate may be ethyl methacrylate and the EAA may be ethylene-ethyl methacrylate copolymer (EEMA). The ethyl acrylate or ethyl methacrylate comonomeric unit content of EEA or EEMA, respectively, may independently be from >0 to <3.5 wt %, alternatively from >0 to 3.0 wt %, alternatively from >0 to 2.0 wt %, alternatively from 0.5 to 2.0 wt % based on total weight of the EEA or EEMA bipolymer.

In some aspects the comonomer used to make the copolymer embodiment of the ethylenic-based (co)polymer of the (A) ethylenic-based (co)polymer composition may further include an olefin-functional hydrolyzable silane such as the hydrolyzable silane monomer of paragraph [0019] of WO 2016/200600 A1 (PCT/U.S. Ser. No. 16/033,879 filed May 24, 2016) to Chaudhary; or of U.S. Pat. No. 5,266,627 to Meverden et al. The olefin-functional hydrolyzable silane may be grafted (post-reactor) onto the copolymer embodiment of the ethylenic-based (co)polymer of the (A). Alternatively, the olefin-functional hydrolyzable silane may be copolymerized with ethylene and the comonomer to directly make the copolymer embodiment of the ethylenic-based (co)polymer containing hydrolyzable silyl groups. In some aspects the olefin-functional hydrolyzable silane is vinyltrimethoxysilane (VTMS), vinyltriethoxysilane (VTES), vinyltriacetoxysilane, or gamma-(meth)acryloxy propyl trimethoxy silane and the hydrolyzable silyl groups are 2-trimethoxysilylethyl, 2-triethoxysilyethyl, 2-triacetoxysilylethyl, or 3-trimethoxysilylpropyloxycarbonylethyl or 3-trimethoxysilylpropyloxycarbonylpropyl.

The (A) ethylenic-based (co)polymer composition may be free of a polypropylene polymer. Alternatively the (A) ethylenic-based (co)polymer composition may further comprise a polypropylene polymer containing 99 to 100 wt % propylenic monomeric units; alternatively a propylene/ethylene copolymer containing 50 to <100 wt % propylenic monomeric units and 50 to 0 wt % ethylenic comonomeric units; alternatively a propylene/ethylene/diene (EPDM) copolymer containing 50 to <100 wt % propylenic monomeric units, 49 to >0 wt % of ethylenic units, and 20 to 1 wt % dienic comonomeric units. The diene used to make the dienic comonomeric units may be 1,3-butadiene, 1,5-hexadiene, 1,7-octadiene, ethylidene norbornene, dicyclopentadiene, or vinyl norbornene.

The (A) ethylenic-based (co)polymer composition may be a blend of two or more different ethylenic-based (co)polymers or a reactor product of polymerization reactions with two or more different catalysts. The (A) ethylenic-based (co)polymer composition may be made in two or more reactors, such as ELITE™ polymers from The Dow Chemical Company.

The (A) ethylenic-based (co)polymer composition may be made by any suitable process, many of which are well-known in the art. Any conventional or hereafter discovered production process for producing polyolefin polymers may be employed for preparing the (A). Typically the production process comprises one or more polymerization reactions. For example, the ethylenic-based (co)polymer may be a LDPE, which may be prepared using a high pressure polymerization process. Alternatively, the ethylenic-based (co)polymer may be prepared using a coordination polymerization process conducted using one or more polymerization catalysts such as Ziegler-Natta, chromium oxide, metallocene, post-metallocene catalysts. Suitable temperatures are from 0° to 250° C., or 30° or 200° C. Suitable pressures are from atmospheric pressure (101 kPa) to 10,000 atmospheres (approximately 1,013 MegaPascals ("MPa")). In most polymerization reactions, the molar ratio of catalyst to polymerizable olefins (monomer/comonomer) employed is from $10^{-12}$:1 to $10^{-1}$:1, or from $10^{-9}$:1 to $10^{-5}$:1.

Polymerization methods suitable for making the crosslinkable ethylene/unsaturated carboxylic ester copolymer embodiment of the copolymer embodiment of the ethylenic-based (co)polymer of the (A) ethylenic-based (co)polymer composition are generally well-known. The crosslinkable ethylene/unsaturated carboxylic ester copolymer may be made by copolymerizing ethylene and one or more unsaturated carboxylic ester comonomers in a reactor at low pressure or high pressure (e.g., without catalyst) to give the crosslinkable ethylene/unsaturated carboxylic ester copolymer. Alternatively, the crosslinkable ethylene/unsaturated carboxylic ester copolymer may be made by a post-reactor grafting method such as reactive extrusion of a polyethylene with a comonomer such as the unsaturated carboxylic ester, optionally initiated or accelerated with peroxides or catalysts, to make a graft copolymer form of the crosslinkable ethylene/unsaturated carboxylic ester copolymer.

The (A) ethylenic-based (co)polymer composition may be in a bulk form of granules or pellets. The amount of the (A) ethylenic-based (co)polymer composition in the polyolefin formulation may be from 60 to 99.45 wt %, alternatively from 75 to 99.45 wt %, alternatively from 80 to 99.00 wt %, alternatively from 85 to 99.00 wt %, alternatively from 90 to 98 wt %, all based on the total weight of the polyolefin formulation.

The constituent (B) antioxidant: an organic molecule that inhibits oxidation, or a collection of such molecules. The (B) antioxidant functions to provide antioxidizing properties to the polyolefin composition and/or crosslinked polyolefin product. The (B) antioxidant may be a hindered phenol, a sulfur-functional compound, a phosphite, a phosphonite, a polyamine (e.g., polymerized 2,2,4-trimethyl-1,2-dihydroquinoline, e.g., AGERITE RESIN D), or a combination of any two or more thereof. Examples of suitable (B) are bis(4-(1-methyl-1-phenylethyl)phenyl)amine (e.g., NAUGARD 445); 2,2'-methylene-bis(4-methyl-6-t-butylphenol) (e.g., VANOX MBPC); 2,2'-thiobis(2-t-butyl-5-methylphenol (CAS No. 90-66-4; 4,4'-thiobis(2-t-butyl-5-methylphenol) (also known as 4,4'-thiobis(6-tert-butyl-m-cresol), CAS No. 96-69-5, commercially LOWINOX TBM-6); 2,2'-thiobis(6-t-butyl-4-methylphenol (CAS No. 90-66-4, commercially LOWINOX TBP-6); tris[(4-tert-butyl-3-hydroxy-2,6-dimethylphenyl)methyl]-1,3,5-triazine-2,4,6-trione (e.g., CYANOX 1790); pentaerythritol tetrakis(3-(3, 5-bis(1,1-dimethylethyl)-4-hydroxyphenyl)propionate (e.g., I RGANOX 1010, CAS Number 6683-19-8); 3,5-bis(1,1-dimethylethyl)-4-hydroxybenzenepropanoic acid 2,2'-thiodiethanediyl ester (e.g., IRGANOX 1035, CAS Number 41484-35-9); distearyl thiodipropionate ("DSTDP"); dilauryl thiodipropionate (e.g., IRGANOX PS 800); stearyl 3-(3, 5-di-t-butyl-4-hydroxyphenyl)propionate (e.g., I RGANOX 1076); 2,4-bis(dodecylthiomethyl)-6-methylphenol (IRGANOX 1726); 4,6-bis(octylthiomethyl)-o-cresol (e.g. IRGANOX 1520); and 2',3-bis[[3-[3,5-di-tert-butyl-4-hydroxyphenyl]propionyl]] propionohydrazide (IRGANOX 1024). In some aspects (B) is 4,4'-thiobis(2-t-butyl-5-methylphenol) (also known as 4,4'-thiobis(6-tert-butyl-m-cresol); 2,2'-thiobis(6-t-butyl-4-methylphenol; tris[(4-tert-butyl-3-hydroxy-2,6-dimethylphenyl)methyl]-1,3,5-triazine-2,4,6-trione; distearyl thiodipropionate; or dilauryl thiodipropionate; or a combination of any two or more thereof. The combination may be tris[(4-tert-butyl-3-hydroxy-2,6-dimethylphenyl)methyl]-1,3,5-triazine-2,4,6-trione and distearyl thiodipropionate. In some aspects the polyolefin formulation and crosslinked polyolefin product is free of (B) antioxidant. When present, the (B) antioxidant may be from 0.01 to 1.5 wt %, alternatively 0.05 to 1.2 wt %, alternatively 0.1 to 1.0 wt % of the polyolefin formulation.

The constituents (C) first organic peroxide and (D) second organic peroxide may independently be a monoperoxide of formula $R^O$—O—O—$R^O$ or a diperoxide of formula $R^O$—O—O—R—O—O—$R^O$, wherein each $R^O$ is a $(C_1-C_{20})$ alkyl group, a $(C_1-C_{20})$alkyl-C(=O)-group, a $(C_1-C_{20})$alkyl-O—C(=O)-group, or a $(C_6-C_{10})$aryl group and R is a divalent group that is a $(C_2-C_{10})$alkylene, a —C(=O)—$(C_2-C_{10})$alkylene, —C(=O)—$(C_2-C_{10})$alkylene-C(=O)—, a $(C_3-C_6)$cycloalkylene, or phenylene; with the proviso that constituents (C) and (D) are free of a —OOH group.

In some aspects the (C) first organic peroxide and/or (D) second organic peroxide independently has a 10-hour half-life temperature that is less than or equal to 110.0° C. and/or a 1-hour half-life temperature that is less than or equal to 130.0° C. An example of such organic peroxide is a monoperoxide that is (name and [CAS number]): diisobutyryl peroxide [3437-84-1]; cumyl peroxyneodecanoate [26748-47-0]; di(3-methoxybutyl) peroxydicarbonate [52238-68-3]; 1,1,3,3-tetramethylbutyl peroxyneodecanoate [51240-95-0]; cumyl peroxyneoheptanoate [130097-36-8]; tert-amyl peroxyneodecanoate [68299-16-1]; a mixture of peroxydicarbonates [78350-78-4, 19910-65-7, and 105-65-6]; di-sec-butyl peroxydicarbonate [19910-65-7]; diisopropyl peroxydicarbonate [105-64-6]; di(4-tert-butylcyclohexyl) peroxydicarbonate [15520-11-3]; di(2-ethylhexyl) peroxydicarbonate [16111-62-9]; tert-butyl peroxyneodecanoate [26748-41-4]; dibutyl peroxydicarbonate [16215-49-9]; dicetyl peroxydicarbonate [26322-14-5]; dimyristyl peroxydicarbonate [53220-22-7]; 1,1,3,3-tetramethylbutyl peroxypivalate [22288-41-1]; tert-butyl peroxyneoheptanoate [26748-38-9]; tert-amyl peroxypivalate [29240-17-3]; tert-butyl peroxypivalate [927-07-1]; di(3,5,5-trimethylhexanoyl) peroxide [3851-87-4]; dilauroyl peroxide [105-74-8]; didecanoyl peroxide [762-12-9]; 1,1,3,3-tetramethylbutyl peroxy-2-ethylhexanoate [22288-43-3]; tert-amyl peroxy-2-ethylhexanoate [686-31-7]; dibenzoyl peroxide [94-36-0]; tert-butyl peroxy-2-ethylhexanoate [3006-82-4]; tert-butyl peroxydiethylacetate [2550-33-6]; tert-butyl peroxyisobutyrate [109-13-7]; tert-amylperoxy 2-ethylhexyl carbonate [70833-40-8]; tert-amyl peroxyacetate [690-83-5]; tert-butyl peroxy-3,5,5-trimethylhexanoate [13122-18-4]; tert-butylperoxy isopropyl carbonate [2372-21-6]; tert-butylperoxy 2-ethylhexyl carbonate [34443-12-4]; tert-amyl peroxybenzoate [4511-39-1]; tert-butyl peroxyacetate [107-71-1]; tert-butyl peroxybenzoate [614-45-9]; or a combination of any two thereof. Another example of such organic peroxide is a diperoxide that is (name and [CAS number]): 2,5-dimethyl-2,5-di(2-ethylhexanoylperoxy) hexane [13052-09-0]; 1,1-di(tert-butylperoxy)-3,3,5-trimethylcyclohexane [6731-36-8]; 1,1-di(tert-amylperoxy)cyclohexane [15667-10-4]; 1,1-di(tert-butylperoxy)cyclohexane [3006-86-8]; 2,2-di(tert-butylperoxy)butane [2167-23-9]; butyl 4,4-di(tert-butylperoxy)valerate [995-33-5]; or a combination of any two thereof. The aforenamed examples of (C) and (D) are commercially available (e.g., from AkzoNobel and/or Gelest Inc.)

In some aspects the (C) first organic peroxide and/or (D) second organic peroxide independently has a 10-hour half-life temperature that is greater than 110.0° C. and/or a 1-hour half-life temperature that is greater than 130.0° C. An example of such organic peroxide is a monoperoxide that is (name and [CAS number]): dicumyl peroxide [80-43-3]; tert-butyl cumyl peroxide [3457-61-2]; di-tert-butyl peroxide [110-05-4]; 3,3,5,7,7-pentamethyl-1,2,4-trioxepane [215877-64-8]; or a combination of any two thereof. Another example of such organic peroxide is a diperoxide that is (name and [CAS number]): a di(tert-butylperoxyisopropyl)benzene [25155-25-3] (a single regioisomer or a mixture of two or three regioisomers); 2,5-dimethyl-2,5-di (tert-butylperoxy)hexane [78-63-7]; 2,5-dimethyl-2,5-di (tert-butylperoxy)hexyne-3 [1068-27-5]; 3,6,9-triethyl-3,6,9-trimethyl-1,4,7-triperoxonane [24748-23-0]; or a combination of any two thereof. The aforenamed examples of (C) and (D) are commercially available (e.g., from AkzoNobel and/or Gelest Inc.)

The optional constituent (E) alkenyl-functional coagent: a molecule that contains a backbone or ring substructure and two or more propenyl, acrylate, and/or vinyl groups bonded thereto, wherein the substructure is composed of carbon atoms and optionally nitrogen atoms, or a collection of such molecules. The (E) alkenyl-functional coagent may be free of silicon atoms. The (E) alkenyl-functional coagent may be a propenyl-functional coagent as described by any one of limitations (i) to (v): (i) (E) is 2-allylphenyl allyl ether; 4-isopropenyl-2,6-dimethylphenyl allyl ether; 2,6-dimethyl-4-allylphenyl allyl ether; 2-methoxy-4-allylphenyl allyl ether; 2,2'-diallyl bisphenol A; O,O'-diallyl bisphenol A; or tetramethyl diallylbisphenol A; (ii) (E) is 2,4-diphenyl-4-methyl-1-pentene or 1,3-diisopropenylbenzene; (iii) (E) is triallyl isocyanurate ("TAIC"); triallyl cyanurate ("TAC"); triallyl trimellitate ("TATM"); N,N,N',N',N'',N''-hexaallyl-1,3,5-triazine-2,4,6-triamine ("HATATA"; also known as $N^2,N^2,N^4,N^4,N^6,N^6$-hexaallyl-1,3,5-triazine-2,4,6-triamine); triallyl orthoformate; pentaerythritol triallyl ether; triallyl citrate; or triallyl aconitate; (iv) (E) is a mixture of any two of the propenyl-functional coagents in (i). Alternatively, the (E) may be an acrylate-functional conventional coagent selected from trimethylolpropane triacrylate ("TMPTA"), trimethylolpropane trimethylacrylate ("TMPTMA"), ethoxylated bisphenol A dimethacrylate, 1,6-hexanediol diacrylate, pentaerythritol tetraacrylate, dipentaerythritol pentaacrylate, tris(2-hydroxyethyl) isocyanurate triacrylate, and propoxylated glyceryl triacrylate. Alternatively, the (E) may be a vinyl-functional coagent selected from polybutadiene having at least 50 wt % 1,2-vinyl content and trivinyl cyclohexane ("TVCH"). Alternatively, the (E) may be an alkenyl-functional coagent described in U.S. Pat. Nos. 5,346,961 or 4,018,852. Alternatively, the (E) may be alpha-methyl styrene dimer (AMSD). Alternatively, the (E) may be a combination or any two or more of the foregoing alkenyl-functional coagents. In some aspects the polyolefin formulation and crosslinked polyolefin product is free of (E) alkenyl-functional coagent. When present, the (E) alkenyl-functional coagent may be 0.01 to 4.5 wt %, alternatively 0.05 to 2 wt %, alternatively 0.1 to 1 wt %, alternatively 0.2 to 0.5 wt % of the polyolefin formulation.

The optional constituent (F) a tree retardant (e.g., a water tree retardant); a molecule that inhibits water and/or electrical treeing, or a collection of such molecules. The tree retardant may be a water tree retardant or electrical tree retardant. The water tree retardant is a compound that inhibits water treeing, which is a process by which polyolefins degrade when exposed to the combined effects of an electric field and humidity or moisture. The electrical tree retardant, also called a voltage stabilizer, is a compound that inhibits electrical treeing, which is an electrical pre-breakdown process in solid electrical insulation due to partial electrical discharges. Electrical treeing can occur in the absence of water. Water treeing and electrical treeing are problems for electrical cables that contain a coated conductor wherein the coating contains a polyolefin. The (F) may be a poly(ethylene glycol) (PEG). In some aspects the polyolefin composition and crosslinked polyolefin product is free of (F) tree retardant. When present, the (F) tree retardant may be from 0.01 to 1.5 wt %, alternatively 0.05 to 1.2 wt %, alternatively 0.1 to 1.0 wt % of the polyolefin composition.

The optional constituent (G) hindered amine stabilizer: a molecule that contains a basic nitrogen atom that is bonded to at least one sterically bulky organo group and functions as an inhibitor of degradation or decomposition, or a collection of such molecules. The (G) is a compound that has a sterically hindered amino functional group and inhibits oxidative degradation and can also increase the shelf lives of the polyolefin formulation. Examples of suitable (G) are butanedioic acid dimethyl ester, polymer with 4-hydroxy-2,2,6,6-tetramethyl-1-piperidine-ethanol (CAS No. 65447-77-0, commercially LOWILITE 62); and N,N'-bisformyl-N,N'-bis(2,2,6,6-tetramethyl-4-piperidinyl)-hexamethylenediamine (CAS No. 124172-53-8, commercially Uvinul 4050 H). In some aspects the polyolefin composition and crosslinked polyolefin product is free of (G) hindered amine stabilizer. When present, the (G) hindered amine stabilizer may be from 0.001 to 1.5 wt %, alternatively 0.002 to 1.2 wt %, alternatively 0.002 to 1.0 wt %, alternatively 0.005 to 0.5 wt %, alternatively 0.01 to 0.2 wt %, alternatively 0.05 to 0.1 wt % of the polyolefin composition.

The optional constituent (H) calcined clay filler is a treated mineral made by heating a hydrous aluminum phyllosilicate to desiccate (i.e., drive off water) the hydrous aluminum phyllosilicate to give a calcined aluminum phyllosilicate. The treated mineral may comprise the calcined aluminum phyllosilicate and, optionally, zero, one or more of additional elements selected from iron, magnesium, alkali metals, and alkaline earths. The (H) calcined clay may be a calcined kaolin mineral, a calcined smectite mineral, a calcined illite mineral, a calcined chlorite mineral, a calcined sepiolite mineral, or a calcined attapulgite mineral. The calcined kaolin mineral may be a calcined kaolinite, calcined dikite, calcined halloysite, or calcined nacrite. The calcined smectite mineral may be a calcined montmorilonite, a calcined nontronite, a calcined beidellite, or a calcined saponite. The calcined illite mineral may be a calcined clay-mica. The (H) calcined clay may be a calcined montmorillonite, calcined nontronite, calcined beidellite, calcined volkonskoite, calcined hectorite, calcined saponite, calcined sauconite; calcined vermiculite; calcined halloisite; calcined sericite; or a combination of any two or more thereof. In some aspects the calcined clay is a calcined montmorillonite or a calcined kaolin mineral such as Translink 37 from BASF. In some aspects the polyolefin formulation and crosslinked polyolefin product is free of (H) calcined clay. The (H) calcined clay, when present, may be in an amount from >0 to 39.45 wt %, alternatively from >0 to 33 wt %, alternatively from >0 to 25.0 wt %, alternatively from 0.1 to 20 wt %, alternatively from 3 to 10 wt %, all based on the total weight of the polyolefin formulation.

In addition the polyolefin formulation may further comprise 0.005 to 1 wt %, alternatively 0.005 to 0.5 wt % each of one or more optional additives selected from an acid scavenger, a carbon black, a carrier resin, a colorant, an extender oil, a flame retardant, a lubricant, a metal deactivator, a methyl radical scavenger, a nucleating agent, a plasticizer, a processing aid, a scorch retardant, a slip agent, and a surfactant. In some aspects the polyolefin formulation and crosslinked polyolefin product is free of any one of the immediately foregoing additives.

The crosslinked polyolefin product: a reaction product that contains networked polyethylenic resins that contain C—C bond crosslinks formed during curing of the polyolefin formulation. The networked polyethylenic resins may comprise reaction products of coupling macromolecules of the (A) ethylenic-based (co)polymer composition to give a network structure.

The crosslinked polyolefin product may also contain by-products of curing such as alcohol by-products of the decomposition or reaction of the (C) and/or (D) organic peroxides and/or by-products of a reaction of any present optional additives or constituents such as (E) alkenyl-functional coagent.

The crosslinked polyolefin product may be in a divided solid form or in continuous form. The divided solid form may comprise granules, pellets, powder, or a combination of any two or more thereof. The continuous form may be a molded part (e.g., injection molded part) or an extruded part (e.g., a coated conductor or a cable).

A compound includes all its isotopes and natural abundance and isotopically-enriched forms. The enriched forms may have medical or anti-counterfeiting uses.

Any compound, composition, formulation, mixture, or product herein may be free of any one of the chemical elements chosen from: H, Li, Be, B, C, N, O, F, Na, Mg, Al, Si, P, S, Cl, K, Ca, Sc, Ti, V, Cr, Mn, Fe, Co, Ni, Cu, Zn, Ga, Ge, As, Se, Br, Rb, Sr, Y, Zr, Nb, Mo, Tc, Ru, Rh, Pd, Ag, Cd, In, Sn, Sb, Te, I, Cs, Ba, Hf, Ta, W, Re, Os, Ir, Pt, Au, Hg, Tl, Pb, Bi, lanthanoids, and actinoids; with the proviso that chemical elements required by the compound, composition, formulation, mixture, or reaction product (e.g., C and H required by a polyethylene or C, H, and O required by an alcohol) are not excluded.

The following apply unless indicated otherwise. Alternatively precedes a distinct embodiment. ASTM is ASTM International, West Conshohocken, Pa., USA. IEC is International Electrotechnical Commission, Geneva, Switzerland. ISO is International Organization for Standardization, Geneva, Switzerland. Any comparative example is used for illustration purposes only and shall not be deemed prior art. Free of or lacks means a complete absence of; alternatively not detectable. IUPAC is International Union of Pure and Applied Chemistry (IUPAC Secretariat, Research Triangle Park, N.C., USA). May confers a permitted choice, not an imperative. Operative means functionally capable or effective. Optional(ly) means either is absent (excluded), or alternatively is present (included). PPM are weight based. Properties are measured using standard test methods and conditions therefor (e.g., viscosity: 23° C. and 101.3 kPa). Ranges include endpoints, subranges, and whole and/or fractional values subsumed therein, except a range of integers does not include fractional values. Room temperature: 23° C.±1° C.

AC Breakdown (ACBD) Strength Test Method (ACBD after crosslinking, unaged or aged (kV/mm)): also known as AC Dielectric Strength. Prepare test specimen as a nominally 0.90 mm (35 mils) thick cured (crosslinked) compression molded plaque using Compression Molding Method 2, described below. Age specimen in a glass U-tube filled with 0.01 Molar (M) aqueous sodium chloride for 21 days at 6 kilovolts (kV) to give aged specimen. Test ACBD Strength of unaged or aged specimen on a Brinkman AC Dielectric Strength Tester using Exxon Univolt N61 transformer oil.

Compression Molding Method 1: (used to prepare test samples for melt rheological measurements), compression molded at the following conditions to prevent significant crosslinking due to the decomposition of one or more of the peroxides: 500 pounds per square inch (psi) (3.5 MPa) at 120° C. for 3 minutes, followed by 2500 psi (17 MPa) at 120° C. for 3 minutes, cooling to 30° C. at 2500 psi (17 MPa), and opening the press to remove the resulting molded plaque.

Compression Molding Method 2: (used to prepare test samples for electrical and mechanical measurements). compression molded at the following conditions to make completely cured (crosslinked) specimens of different dimensions: 500 psi (3.5 MPa) at 125° C. for 3 minutes, followed by 2500 psi (17 MPa) at 180° C. for 20 minutes, cooling to 30° C. at 2500 psi (17 MPa), and opening the press to remove the resulting molded plaque.

Density is measured according to ASTM D792-13, *Standard Test Methods for Density and Specific Gravity (Relative Density) of Plastics by Displacement*, Method B (for testing solid plastics in liquids other than water, e.g., in liquid 2-propanol). Test sample is unaged solid in the form of a sheet or molded specimen. Report results in units of grams per cubic centimeter (g/cm$^3$ or g/cc).

Dielectric Constant and Dissipation Factor Test Methods (Dissipation Factor at 2 kV, 130° C., 60 Hz after crosslinking (%)). Conduct tests according to ASTM D150-11, *Standard Test Methods for AC Loss Characteristics and Permitivity (Dielectric Constant) of Solid Electrical Insulation*, at 60 Hz on a GUILDLINE High Voltage Capacitance Bridge unit, Model 9920A, with a TETTEX specimen holder and a TETTEX AG Instruments Temperature Control Unit. Test specimen is a cured (crosslinked) 1.3 mm (50 mils) thick compression molded plaque prepared by Compression Molding Method 2. Degas the plaque in a vacuum oven at 60° C. for five days. Cut a circular disc-shaped specimen having a diameter of 88.9 millimeters (mm, 3.5 inches) from a compression molded and degassed plaque, and test the specimen at 60 Hertz (Hz) and 2 kV applied stress at temperatures of 25°, 40°, 90°, and 130° C.

Dynamic Oscillatory Shear Viscosity Test Method (V0.1/V100 at 135° C. and V100 at 135° C. (Pa·s)) is conducted over a range from 0.1 radian per second (rad/s., "V0.1") to 100 rad/s. ("V100") using a TA Instruments Advanced Rheometric Expansion System at a temperature of 135° C. and 0.25% strain, representative of insulation layer extrusion conditions. V0.1 and V100 are the viscosities at 0.1 rad/s. and 100 rad/s., respectively, and the ratio V0.1/V100 is a measure of shear thinning characteristics. Measured viscosity in pascal-seconds (Pa·s). Test specimen is taken from an unaged compression molded plaque prepared by Compression Molding Method 1.

Extensional Viscosity Test Method (Extensional Viscosity at 135° or 150° C., 1/s., Hencky strain of 0.2, 0.5, or 1 (Pa·s); Maximum Extensional Viscosity at 135° or 150° C., 1/s. (Pa·s); and Hencky Strain corresponding To Max. Ext. Viscosity at 135° or 150° C., 1/s.): is measured using an ARES FCU Rheometer with Extensional Viscosity Fixture Geometry and TA Orchestrator Software. Conduct the test at a rate of 1 per second at 135° or 150° C. to simulate extrusion conditions. Report the maximum viscosity value (peak) attained, the maximum Hencky strain attained, and viscosities at Hencky Strains of 0.2, 0.5 and 1. Test specimen is taken from an unaged compression molded plaque prepared by Compression Molding Method 1. Measured in poise and converted to kilopascal-seconds (kPa·s), wherein 100,000 poise=10.0 kPa·s.

Gel Content Test Method: determine gel content (insoluble fraction) produced in ethylene plastics by crosslinking by extracting the polymer with decahydronaphthalene (decalin) according to ASTM D2765. This is one way of measuring degree or extent of crosslinking. Conduct the test on specimens that come out of the below MDR experiments at 182° C. Use a WILEY mill (20 mesh screen) to prepare powdered samples, at least one gram of material for each sample. Make pouch from a 120 mesh screen. Fabricate pouch carefully to avoid leaks of powdered samples therefrom. The width of the finished pouch is no more than 1.90 centimeters (cm, 0.75 inch), and the length is no more than 5.08 cm (2 inches). Weigh the empty pouch on an analytical balance. Place 0.3 gram (+/− 0.02 g) of powdered sample into the pouch. Do not to force open the folds in the pouch. Weigh the pouch+sample. Seal the pouch with a staple, and weigh the sealed pouch with sample inside and staple. Place the sealed pouch into a flask containing 1 liter (L) of boiling decahydronaphthalene (decalin) and 10 grams of 2,2'-methylene-bis (4-methyl-6-tertiary butyl phenol). Boil for 6 hours in a flask in a heated mantle, turn off the voltage regulator, and keep cooling water running until (decalin) has cooled below its flash point. When the decalin has cooled, turn off the cooling water, and remove the pouch from the flask. Allow the pouch to cool under a hood to remove as much solvent as possible. Then place the pouch in a vacuum oven set at 150° C. for 4 hours, maintaining a vacuum of 25 inches (635 mm) of mercury. Take the pouch out of the oven, and allow it to cool to room temperature. Record weight of the cooled pouch+remaining sample+staple on an analytical balance. Calculate percent extraction (% Extraction) using the following equation: % Extraction=100×(W3-W4)/(W2-W1), wherein x indicates multiplication, / indicates division, W1 is weight of empty pouch; W2 is weight of pouch+ sample before stapling; W3 is weight of sample, pouch and staple; and W4 is weight of pouch, staple, and remaining sample after extraction. Gel content=100%−% Extraction.

Half-Life Temperature Test Method: measured on a solution of organic peroxide at a concentration of 0.1 Molar (M) in dodecane with monitoring of heat flux of decomposition of organic peroxide by differential scanning calorimetry-thermal activity monitoring (DSC-TAM) and compared relative to heat flux of pure dodecane. The heat emitted by the solution is directly related to the organic peroxide concentration [P]. The 1-hour half-life temperature is the measure of thermal energy at which 50 percent (50.0 percent) of the organic peroxide is decomposed after 60 minutes (60.0 minutes) of heating at that temperature. The 10-hour half-life temperature is the measure of thermal energy at which 50 percent (50.0 percent) of the organic peroxide is decomposed after 600 minutes (600.0 minutes) of heating at that temperature. The 1-hour half-life temperature is greater than the 10-hour half-life temperature. The greater the 1-hour or 10-hour half-life temperature of an organic peroxide, the greater the stability of the peroxide in the test method, and the greater the stability of the organic peroxide in the polyolefin formulation.

Hot Creep Elongation and Hot Set Test Methods (Hot Creep at 200° C., 0.2 MPa after crosslinking (%)): hot creep elongation is measured to determine degree or extent of curing (crosslinking) and hot set is used to measure sample relaxation after hot creep elongation. Base testing on ICEA-T-28-562-2003 test method for power cable insulation materials. Conduct hot creep on a 1.3 millimeter (mm, 50 mils) thick specimen, prepared by Compression Molding Method 2, in an oven with a glass door and set at 150° or 200° C. using a force of 0.2 megapascal (MPa) stress applied to the bottom of the specimen. Cut three specimens of each sample material from tensile bars made according to ASTM D412 type D. Elongate the specimens for 15 minutes, and measure their percentage increases in length. Report the average of the three values as hot creep. Obtain hot set values for the same specimens after removing the load for 5 minutes under heat and cooling the specimens at room temperature for 10 minutes. A sample that breaks or has a hot creep >175% fails the test. A sample that does not break and has a hot creep <175% passes the test.

Melt index ($I_2$) is measured according to ASTM D1238-04 (190° C., 2.16 kg), *Standard Test Method for Melt Flow Rates of Thermoplastics by Extrusion Platometer*, using conditions of 190° C./2.16 kilograms (kg), formerly known as "Condition E" and also known as $I_2$. Report results in units of grams eluted per 10 minutes (g/10 min.) or the equivalent in decigrams per 1.0 minute (dg/1 min.). 10.0 dg=1.00 g. The measured $I_2$ is an amount of a polyolefin polymer (e.g., polyethylene) at 190° C. that can be forced through an extrusion rheometer orifice of inner diameter 2.0955 millimeters (0.0825 inch) during 10 minutes when the polymer is subjected to a force of 2.16 kilograms (kg). $I_2$ is inversely proportional to the weight average molecular weight ($M_w$) of the polyolefin polymer, although the inverse proportionality is not necessarily linear. Thus, generally the higher the $M_w$, the lower the $I_2$.

Scorch Time and Ultimate Crosslinking Test Methods (MDR: ts1 at 140° C. (minutes)); and MH-ML (N-m), respectively): Perform Moving Die Rheometer (MDR) analyses on test material using Alpha Technologies Rheometer MDR model 2000 unit. Base testing on ASTM procedure D 5289, "*Standard Test Method for Rubber—Property Vulcanization Using Rotorless Cure Meters*". Perform the MDR analyses using 6 grams of test material. Test material at 182° or 140° C. at 0.5 degrees arc oscillation for both temperature conditions. Obtain materials for testing directly from the BRABENDER™ mixing bowl after cold pressing. Put test material into the MDR instrument. Elastic torque is measured as a function of time from 0 (start) to 120 minutes at 140° C. or from 0 (start) to 20 minutes at 182° C., respectively, and elastic torque curve versus time is plotted. Assess scorch time, also referred to as time to scorch or resistance to premature crosslinking at extrusion conditions, by ts1 (time for 0.113 Newton-meter (N-m) increase in elastic torque from minimum value (ML) at 140° C. Abbreviate scorch time as ts1@140° C. Ultimate degree of crosslinking is reflected by MH (maximum elastic torque)–ML (minimum elastic torque) at 182° C.

Shore A and Shore D Hardness Test Methods: prepare crosslinked specimens with 6.4 mm (250 mils) thickness and 51 mm diameter, and test using ASTM D2240-15, *Standard Test Method for Rubber Property—Durometer Hardness*. Record average of 5 measurements. Test specimen is an unaged compression molded plaque prepared by Compression Molding Method 2.

Tensile Strength, Tensile Elongation, Tensile Modulus, and Tensile Secant Modulus Test Method. Prepare test specimens as Type IV dog-bone-shaped specimen having a nominal 1.78 mm (70 mils) thickness, cut from plaques prepared by Compression Molding Method 2. Measure tensile properties on unaged crosslinked polyolefin product specimens that have been kept at 23° C. after molding and on aged crosslinked polyolefin product specimens that have been aged for up to 7 days in an oven at 136° C. using a Type II ASTM D5423-93 Testing Mechanical Convection Oven. Conduct tensile measurements according to ASTM D638-10, *Standard Test Method for Tensile Properties of Plastics*, and UL 1581, *Reference Standard for Electrical Wires, Cables, and Flexible Cords*, and UL 2556, *Wire and Cable Test Methods*, at a displacement rate of 50.8 cm (20 inches) per minute. Record average of 5 measurements.

Zero shear viscosity (Zero Shear Viscosity at 135° C. (Pa·s)) is deduced from the Dynamic Oscillatory Shear Viscosity Test Method or is measured from creep recovery using SR-200, 25.0 Pascals, 3 minutes creep, 15 minutes recovery, 135° C. Test specimen is an unaged compression molded plaque prepared by Compression Molding Method 1.

EXAMPLES

Ethylenic-based (co)polymer (A1): a high pressure reactor made, low density polyethylene (LDPE) product, which has a density of 0.922 g/cm$^3$, and a melt index (I$_2$) of 1.8 g/10 min. (190° C., 2.16 kg) and is obtained from The Dow Chemical Company, Midland, Mich., USA. The Ethylenic-based (co)polymer (A1) is made in a tubular high pressure reactor and process of the type described in *Introduction to Polymer Chemistry*, Stille, Wiley and Sons, New York, 1962, pages 149 to 151. The process is free radical initiated and is conducted at a pressure from 170 to 310 megapascals (MPa, i.e., 25,000 to 45,000 pounds per square inch (psi)) and a temperature from 200° to 350° C.

Ethylenic-based (co)polymer (A2): a molecular catalyst-made ethylene/1-octene elastomeric copolymer developmental product number XUS 38660.00, which has a density of 0.870 g/cm$^3$; and a melt index (I$_2$) of 4.8 g/10 min. (190° C., 2.16 kg) and is obtained from The Dow Chemical Company.

Ethylenic-based (co)polymer (A3): a molecular catalyst-made ethylene/1-octene elastomeric copolymer developmental product number XUS 38661.00, which has a density of 0.880 g/cm$^3$; and a melt index (I$_2$) of 18 g/10 min. (190° C., 2.16 kg) and is obtained from The Dow Chemical Company.

Ethylenic-based (co)polymer (A4): a pelletized low density polyethylene compound containing 2 wt % dicumyl peroxide and having a density of 0.92 g/cm$^3$, a V0.1/V100 at 135° C. of 34.3, and a V100 at 135° C. of 672 Pascal-seconds (Pa-s). Obtained from The Dow Chemical Company.

Ethylenic-based (co)polymer (A5): a low density polyethylene product DOW LDPE 6211 having a density of 0.920 g/cm$^3$; and a melt index (I$_2$) of 2.3 g/10 min. (190° C., 2.16 kg). Obtained from The Dow Chemical Company.

Polypropylene homopolymer (hPP): obtained as product FF018F from Braskem and having a melt flow rate of 1.8 g/10 min. (230° C., 2.16 kg, ASTM D1238-04)

Antioxidant (B1): 4,4'-thiobis(2-t-butyl-5-methylphenol) obtained as Lowinox TBM-6 from Addivant.

First organic peroxide (C1): dicumyl peroxide having a 1 hour half-life temperature of 137.0° C. and a 10-hour half-life temperature of 117.1° C. and obtained as Perkadox BC-FF from AkzoNobel.

First organic peroxide (C2): 2,5-dimethyl-2,5-di(tert-butylperoxy)hexane having a 1 hour half-life temperature of 134° C. and a 10-hour half-life temperature of 115° C. and obtained as Luperox 101 from Arkema.

Second organic peroxide (D1): dicumyl peroxide having a 1 hour half-life temperature of 137.0° C. and a 10-hour half-life temperature of 117.1° C. and obtained as Perkadox BC-FF from AkzoNobel.

Alkenyl-functional coagent (E1): alpha-methyl styrene dimer obtained as Nofmer MSD from NOF America Corporation.

Tree Retardant (F1): a polyethylene glycol having an average molecular weight of 20,000 grams/mole and obtained as Polyglykol 20000 SRU from Clariant.

Hindered Amine Stabilizer (G1): 1,3,5-Triazine-2,4,6-triamine, N2,N2''-1,2-ethanediylbis[N2-[3-[[4,6-bis[butyl (1,2,2,6,6-pentamethyl-4-piperidinyl)amino]-1,3,5-triazin-2-yl]amino]propyl]-N',N''-dibutyl-N',N''-bis(1,2,2,6,6-pentamethyl-4-piperidinyl)-(main component) obtained as Sabostab UV 119 from SABO S.p.A. Levate, Italy.

Calcined Clay (H1): a calcined kaolin mineral obtained as Translink 37 from BASF.

General Preparation 1: heat (D1) to 60° C. to melt it. Add (E1) to melt at varying wt/wt ratios (see Table 1) (D1)/(E1) to give a second mixture comprising (D1) and (E1). Separately mix solids (A2), (A4), (B1), (F1), and (G1) in a container by hand to give solids mixture. Compound solids mixture in a 420 mL Brabender batch mixer with cam rotors at 125° C. and 40 rotations per minute (rpm) for 10 minutes to give a blend. While still mixing at 40 rpm, increase temperature to 180° C. and continue mixing for 10 minutes to give first intermediate composition 1. Cold press the blend into thin a thin sheet and cut sheet into strips. Harden strips in freezer, and feed hardened strips through a pelletizer to make pellets comprising first intermediate composition 1. Heat pellets in a glass jar at 50° C. for 2 hours, and spray a measured amount of the second mixture of (D1) and (E1) from a syringe onto the heated pellets. Tumble blend the resulting sprayed pellets in the jar for 10 minutes at room temperature, place jar containing sprayed pellets in an oven at 50° C. for 16 hours, next tumble blend the contents of the jar again for 10 minutes at room temperature, then mix the contents of the jar in a 420 mL Brabender mixing bowl using cam rotors at 120° C. and 30 rpm for 10 minutes to give second intermediate composition 1. The contents of the constituents used are reported below in Table 1. Cold press or compression mold samples of the second intermediate composition 1, as the case may be according to the relevant test method, and characterize the second intermediate composition 1. Results are reported later in Table 2.

General Preparation 2: heat (D1) to 60° C. to melt it. Add (E1) to melt at varying wt/wt ratios (see Tables 3a and 3b) (D1)/(E1) to give a second mixture comprising (D1) and (E1). Separately spray (C2) onto pellets solids (A3), optionally (A5) or (hPP), and mix the resulting mixture with (B1), (F1), and (G1) in a container by hand to give solids mixture. Compound solids mixture in a 420 mL Brabender batch mixer with cam rotors at 125° C. and 40 rotations per minute (rpm) for 10 minutes to give a blend. While still mixing at 40 rpm, increase temperature to 180° C. and continue mixing for 20 minutes to give first intermediate composition 2. Cold press the blend into thin a thin sheet and cut sheet into strips. Harden strips in freezer, and feed hardened strips through a pelletizer to make pellets comprising first intermediate composition 2. Heat pellets in a glass jar at 50° C. for 2 hours, and spray a measured amount of the second mixture of (D1) and (E1) from a syringe onto the heated pellets. Tumble blend the resulting sprayed pellets in the jar for 10 minutes at room temperature, place jar containing sprayed pellets in an oven at 50° C. for 16 hours, next tumble blend the contents of the jar again for 10 minutes at room temperature, then mix the contents of the jar in a 420 mL Brabender mixing bowl using cam rotors at 120° C. and 30 rpm for 10 minutes to give second intermediate composition 1. The contents of the constituents used are reported below in Tables 3a and 3b. Cold press or compression mold samples of the second intermediate composition 2, as the case may be according to the relevant test method, and characterize the second intermediate composition 2. Results are reported later in Tables 4a and 4b.

Comparative Example 1 (CE1): prepared according to General Preparation 1 and having the composition shown in Table 1 and properties shown in Table 2 below.

Inventive Examples 1 to 2 (IE1 to IE2): prepared according to General Preparation 1 and having the composition shown in Table 1 and properties shown in Table 2 below.

TABLE 1 compositions of CE1 and IE1 to IE2.

| Constituent (weight percent) | CE1 | IE1 | IE2 |
|---|---|---|---|
| Ethylenic-based (co)polymer (A1) | 0 | 0 | 0 |
| Ethylenic-based (co)polymer (A2) | 96.48 | 81.48 | 81.84 |
| Ethylenic-based (co)polymer (A3) | 0 | 0 | 0 |
| Ethylenic-based (co)polymer (A4)* | 0 | 15.00 | 15.00 |
| Ethylenic-based (co)polymer (A5) | 0 | 0 | 0 |
| Polypropylene homopolymer (hPP) | 0 | 0 | 0 |
| Antioxidant (B1) | 0.34 | 0.34 | 0.34 |
| First Organic Peroxide (C1)* | 0 | 0.30 | 0.30 |
| Second Organic Peroxide (D1) | 2.00 | 2.00 | 1.70 |
| Alkenyl-functional coagent (E1) | 0.40 | 0.40 | 0.34 |
| Tree Retardant (F1) | 0.58 | 0.58 | 0.58 |
| Hindered Amine Stabilizer (G1) | 0.20 | 0.20 | 0.20 |
| Calcined Clay (H1) | 0 | 0 | 0 |
| Total | 100.00 | 100.00 | 100.00 |

*(C1) at 2 wt % in (A4): 15.00 wt % (A4) × 0.02 (C1)/(A4) = 0.30 wt % (C1).

TABLE 2 characterization properties of CE1 and IE1 to IE2.

| Characterization (unit) | CE1 | IE1 | IE2 |
|---|---|---|---|
| V0.1/V100 at 135° C. | 14.8 | 33.1 | 30.6 |
| V100 at 135° C. (Pa · s) | 1345 | 1397 | 1372 |
| Zero Shear Viscosity at 135° C. - Creep Recovery (Pa · s) | 9081 | 20790 | 20720 |
| Zero Shear Viscosity at 135° C. dynamic oscillatory shear (Pa · s) | 18997 | 59570 | 52659 |
| Extensional Viscosity at 135° C., 1/s., Hencky strain of 0.2 (kPa · s) | 13.2 | 16.5 | 18.4 |
| Extensional Viscosity at 135° C., 1/s., Hencky strain of 0.5 (kPa · s) | 17.3 | 28.2 | 31.1 |
| Extensional Viscosity at 135° C., 1/s., Hencky strain of 1 (kPa · s) | 21.3 | 39.8 | 44.9 |
| Maximum Extensional Viscosity at 135° C., 1/s. (kPa · s) | 41.7 | 183.9 | 214.8 |
| Hencky Strain corresp. To Max. Ext. Viscosity at 135° C., 1/s. | 3.3 | 3.5 | 3.3 |
| MDR: ML at 140° C. (N-m) | 0.021 | 0.032 | 0.029 |
| MDR: ts1 at 140° C. (minutes) | 28.7 | 29.7 | 30.3 |
| MDR: MH – ML at 182° C. (N-m) | 0.54 | 0.56 | 0.48 |
| Gel content after crosslinking (wt %) | 92.7 | 93.9 | 91.2 |
| Gel content after extrusion (wt %) | Not Tested | <1% | <1% |
| Hot Creep at 200° C., 0.2 MPa after crosslinking (%) | 38.5 | 30.5 | 42.4 |
| ACBD after crosslinking, unaged (kV/mm) | 37.1 ± 1.2 | 37.9 ± 0.9 | 39.3 ± 0.8 |
| ACBD after crosslinking, aged (kV/mm) | 36.1 ± 3.0 | 37.0 ± 2.8 | 37.6 ± 2.5 |
| Dissipation Factor at 2 kV, 130° C., 60 Hz after crosslinking (%) | 0.97 | 1.23 | 1.44 |

As shown by the data in Table 2, CE1 has relatively inferior melt shear and extensional properties. Compared with CE1, the greater values of ML (minimum elastic torque, upon melting of the polymer) from the MDR test done at 140° C. observed with IE1 and 1E2 indicate that coupling of the latter compositions had occurred "in situ" during the heat step (compounding) conducted at 180° C. In the dynamic oscillatory shear test conducted at the temperature of 135° C., the compositions of IE1 and 1E2 exhibited enhanced melt shear-thinning characteristics relative to CE1, as evidenced from the values of V0.1/V100. Increases in zero shear and extensional viscosities at 135° C. were also observed with IE1 and IE2, in comparison with CE1. In the MDR test conducted at 140° C., similar values of ts1 (i.e., similar rates of crosslinking) were observed with IE1 and IE2 relative to CE1. That is, essentially all of the crosslinking of IE1 and IE2 measured by MDR can be attributed to the dicumyl peroxide and Nofmer MSD that were imbibed into the first intermediate composition 1 (after reactive compounding of the initial polyolefin formulation to give the first intermediate composition). The temperatures of 135° and 140° C. are representative of temperatures typically used in cable extrusion processes.

The ultimate degrees of crosslinking (as measured by gel content and hot creep) and the dielectric strength values of the inventive examples IE1 to IE2 were sufficiently high. The dissipation factors (at test temperature 130° C.) for IE1 and IE2 were satisfactory and only slightly worse than that of CE1.

Comparative Example 2 (CE2): prepared according to General Preparation 2 and having the composition shown in Table 3a and properties shown in Table 4a below.

Inventive Examples 3 to 8 (IE3 to IE8): prepared according to General Preparation 2 and having the composition shown in Table 3a and 3b and properties shown in Tables 4a and 4b below.

TABLE 3a compositions of CE2 and IE3 to IE5.

| Constituent (weight percent) | CE2 | IE3 | IE4 | IE5 |
|---|---|---|---|---|
| Ethylenic-based (co)polymer (A1) | 0 | 0 | 0 | 0 |
| Ethylenic-based (co)polymer (A2) | 0 | 0 | 0 | 0 |
| Ethylenic-based (co)polymer (A3) | 95.60 | 95.40 | 95.20 | 95.00 |
| Ethylenic-based (co)polymer (A4) | 0 | 0 | 0 | 0 |
| Ethylenic-based (co)polymer (A5) | 0 | 0 | 0 | 0 |
| Polypropylene homopolymer (hPP) | 0 | 0 | 0 | 0 |
| Antioxidant (B1) | 0.51 | 0.51 | 0.51 | 0.51 |
| First Organic Peroxide (C2) | 0 | 0.20 | 0.40 | 0.60 |
| Second Organic Peroxide (D1) | 2.50 | 2.50 | 2.50 | 2.50 |
| Alkenyl-functional coagent (E1) | 0.50 | 0.50 | 0.50 | 0.50 |
| Tree Retardant (F1) | 0.89 | 0.89 | 0.89 | 0.89 |
| Hindered Amine Stabilizer (G1) | 0 | 0 | 0 | 0 |
| Calcined Clay (H1) | 0 | 0 | 0 | 0 |
| Total | 100.00 | 100.00 | 100.00 | 100.00 |

TABLE 3b compositions of IE6 to IE8.

| Constituent (weight percent) | IE6 | IE7 | IE8 |
|---|---|---|---|
| Ethylenic-based (co)polymer (A1) | 0 | 0 | 0 |
| Ethylenic-based (co)polymer (A2) | 0 | 0 | 0 |
| Ethylenic-based (co)polymer (A3) | 86.20 | 77.20 | 90.20 |
| Ethylenic-based (co)polymer (A4)* | 0 | 0 | 0 |
| Ethylenic-based (co)polymer (A5) | 0 | 18.00 | 0 |
| Polypropylene homopolymer (hPP) | 9.00 | 0 | 0 |
| Antioxidant (B1) | 0.51 | 0.51 | 0.51 |
| First Organic Peroxide (C2) | 0.40 | 0.40 | 0.40 |
| Second Organic Peroxide (D1) | 2.50 | 2.50 | 2.50 |
| Alkenyl-functional coagent (E1) | 0.50 | 0.50 | 0.50 |
| Tree Retardant (F1) | 0.89 | 0.89 | 0.89 |
| Hindered Amine Stabilizer (G1) | 0 | 0 | 0 |
| Calcined Clay (H1) | 0 | 0 | 5.00 |
| Total | 100.00 | 100.00 | 100.00 |

TABLE 4a characterization properties of CE2 and IE3 to IE5.

| Characterization (unit) | CE2 | IE3 | IE4 | IE5 |
|---|---|---|---|---|
| V0.1/V100 at 135° C. | 5.6 | 8.4 | 30.5 | 70.3 |
| V100 at 135° C. (Pa · s) | 590 | 639 | 782 | 868 |
| Zero Shear Viscosity at 135° C.: creep recovery (Pa · s) | 1990 | 3230 | 10460 | 40140 |
| Zero Shear Viscosity at 135° C.: dynamic oscillatory shear (Pa · s) | 2651 | 4218 | 27734 | 98584 |
| Extensional Viscosity at 150° C., 1/s., Hencky strain of 0.2 (kPa · s) | 16.8 | 18.9 | 23.9 | 35.2 |
| Extensional Viscosity at 150° C., 1/s., Hencky strain of 0.5 (kPa · s) | 9.7 | 17.6 | 26.3 | 55.4 |
| Extensional Viscosity at 150° C., 1/s., Hencky strain of 1 (kPa · s) | 6.5 | 10.9 | 21.4 | 85.9 |
| Maximum Extensional Viscosity at 150° C., 1/s. (kPa · s) | 48.0 | 72.0 | 179 | 563 |
| Hencky Strain corresp. To Max. Ext. Viscosity at 150° C., 1/s. | 3.09 | 3.56 | 4.10 | 3.14 |
| MDR: ML at 140° C. (N-m) | 0.003 | 0.006 | 0.016 | 0.031 |
| MDR: ts1 at 140° C. (minutes) | 62 | 51.6 | 38.8 | 27.8 |
| MDR: MH − ML at 182° C. (N-m) | 0.40 | 0.49 | 0.63 | 0.70 |
| Gel content after crosslinking (wt %) | 80.8 | 89.6 | 92.2 | 95.0 |
| Gel content after extrusion (wt %) | Not Tested | <1% | <1% | <1% |
| Hot Creep at 200° C., 0.2 MPa after crosslinking (%) | 46.7 | 30.7 | 19.9 | 14.4 |
| ACBD after crosslinking, unaged (kV/mm) | 35.2 ± 1.6 | 30.9 ± 3.7 | 35.8 ± 0.5 | 36.1 ± 1.2 |
| ACBD after crosslinking, aged (kV/mm) | 31.6 ± 2.0 | 31.4 ± 2.5 | 34.7 ± 1.2 | 31.1 ± 2.1 |
| Dissipation Factor at 2 kV, 130° C., 60 Hz after crosslinking (%) | 0.08 | 0.04 | 0.04 | 0.04 |

TABLE 4b

| characterization properties of IE6 to IE8. | | | |
|---|---|---|---|
| Characterization (unit) | IE6 | IE7 | IE8 |
| V0.1/V100 at 135° C. | 28.7 | 43.1 | 27.5 |
| V100 at 135° C. (Pa · s) | 950 | 866 | 862 |
| Zero Shear Viscosity at 135° C.: creep recovery (Pa · s) | 13040 | 15640 | 6983 |
| Zero Shear Viscosity at 135° C.: dynamic oscillatory shear (Pa · s) | 32540 | 52500 | 28758 |
| Extensional Viscosity at 150° C., 1/s., Hencky strain of 0.2 (kPa · s) | 25.6 | 21.3 | 19.9 |
| Extensional Viscosity at 150° C., 1/s., Hencky strain of 0.5 (kPa · s) | 33.2 | 33.0 | 23.7 |
| Extensional Viscosity at 150° C., 1/s., Hencky strain of 1 (kPa · s) | 34.9 | 40.3 | 28.7 |
| Maximum Extensional Viscosity at 150° C., 1/s. (kPa · s) | 135 | 467 | 163 |
| Hencky Strain corresp. To Max. Ext. Viscosity at 150° C. 1/s. | 3.65 | 3.60 | 3.94 |
| MDR: ML at 140° C. (N-m) | 0.016 | 0.019 | 0.015 |
| MDR: ts1 at 140° C. (minutes) | 28.6 | 37.8 | 32.3 |
| MDR: MH – ML at 182° C. (N-m) | 0.56 | 0.63 | 0.71 |
| Gel content after crosslinking (wt %) | 92.5 | 92.1 | 92.6 |
| Gel content after extrusion (wt %) | <1% | <1% | <1% |
| Hot Creep at 200° C., 0.2 MPa after crosslinking (%) | 24.2 | 18.2 | 22.9 |
| ACBD after crosslinking, unaged (kV/mm) | 35.6 ± 1.3 | 35.6 ± 1.5 | 35.1 ± 1.4 |
| ACBD after crosslinking, aged (kV/mm) | 33.6 ± 2.4 | 33.9 ± 0.9 | 33.2 ± 1.2 |
| Dissipation Factor at 2 kV, 130° C., 60 Hz after crosslinking (%) | 0.04 | 0.03 | 0.34 |

As indicated by the data in Tables 4a and 4b, CE2 had relatively inferior melt shear and extensional properties. Compared with CE2, the greater values of ML (minimum elastic torque, upon melting of the polymer) from the MDR test done at 140° C. observed with IE3 to IE5 indicate that coupling of the latter compositions had occurred "in situ" during the compounding step conducted at 180° C. In the dynamic oscillatory shear test conducted at the temperature of 135° C., the compositions of IE3 to IE5 exhibited enhanced melt shear-thinning characteristics relative to CE2, as evidenced from the values of V0.1/V100. Increases in zero shear and extensional viscosities at 135° C. were also observed with IE3 and IE5, in comparison with CE2. The inclusion of minor amounts of polypropylene or LDPE in the compositions resulted in further increases in zero-shear and low-strain extensional viscosities, while a small amount of calcined clay did not have a large effect on melt rheological properties (IE6 to IE8 versus IE4). The temperatures of 135° and 140° C. are representative of temperatures typically used in cable extrusion processes. The compositions of IE3 to IE8 also exhibited satisfactory properties (crosslinking, mechanical and electrical), even after heat-aging. (Hardness, tensile, and heat aging performance data are not shown.)

Incorporate by reference here the below claims as numbered aspects except replace "claim" and "claims" by "aspect" or "aspects," respectively.

The invention claimed is:

1. A method of chemically modifying a polyolefin formulation in such a way as to modify melt viscosity thereof without completely curing the polyolefin formulation, which comprises, prior to the chemical modification, from 60 to 99.45 weight percent (wt %) of (A) an ethylenic-based (co)polymer composition consisting essentially of an ethylenic-based (co)polymer or a combination of the ethylenic-based (co)polymer and a polypropylene polymer, with the proviso that the polypropylene polymer is from 0 to <40 wt % of the polyolefin formulation; from 0.05 to less than 2.00 wt % of (B) an antioxidant; and from 0.15 to 1.00 weight percent (wt %) of (C) a first organic peroxide having a 1-hour half-life temperature of less than or equal to 155 degrees Celsius (° C.) and/or a 10-hour half-life temperature of less than or equal to 135° C., when measured according to the Half-Life Temperature Test Method; wherein all weight percents are based on total weight of the polyolefin formulation; the method comprising heating a melt of the polyolefin formulation, which has been kept at a temperature less than 160.0° C., to a temperature of greater than or equal to 160.0° C., thereby decomposing the (C) first organic peroxide in the melt so as to chemically modify melt viscosity of the polyolefin formulation to give a first intermediate composition having a melt viscosity that is greater than the melt viscosity of the polyolefin formulation, all without completely curing the polyolefin formulation or the first intermediate composition; wherein the melt of the polyolefin formulation comprises a melt of the (A) ethylenic-based (co)polymer composition in contact with the (B) antioxidant and the (C) first organic peroxide; and further comprising contacting the first intermediate composition with from 0.05 to 3.0 wt % of (D) a second organic peroxide having a 1-hour half-life temperature of less than or equal to 155° C. and/or a 10-hour half-life temperature of less than or equal to 135° C., when measured according to the Half-Life Temperature Test Method, described later, to give a second intermediate composition comprising the first intermediate composition and the (D) second organic peroxide.

2. The method of claim 1 further comprising shaping the first intermediate composition or second intermediate composition to give a shaped form composed of the first intermediate composition or second intermediate composition, respectively.

3. The method of claim 1, further comprising curing the second intermediate composition to give a crosslinked polyolefin product.

4. The method of claim 1 further comprising a preliminary step comprising melting a solid form of the (A) ethylenic-based (co)polymer composition so as to give a melt of the (A) ethylenic-based (co)polymer composition.

5. The method of claim 1 described by any one of limitations (i) to (v): (i) the ethylenic-based (co)polymer is a polyethylene homopolymer; (ii) the ethylenic-based (co)polymer is an ethylene/alpha-olefin copolymer comprising 50 to 99.0 wt % ethylenic monomeric units and 50 to >0 wt % ($C_3$-$C_{20}$)alpha-olefin-derived comonomeric units; (iii) the ethylenic-based (co)polymer is ethylene/unsaturated carboxylic ester copolymer comprising from 51 to 99.0 wt % ethylenic monomeric units and from 49 to 1.0 wt % unsaturated carboxylic ester comonomeric units; (iv) the ethylenic-based (co)polymer composition consists essentially of the ethylenic-based (co)polymer of any one of (i) to (iii); and (v) the ethylenic-based (co)polymer composition consists essentially of a combination of the ethylenic-based (co)polymer any one of (i) to (iii) and the polypropylene polymer.

6. The method of claim 1 wherein the (B) antioxidant is a hindered phenol, a sulfur-functional compound, a phosphite, a phosphonite, a polyamine, or a combination of any two or more thereof.

7. The method of claim 1 further characterized by any one of limitations (i) to (xx): (i) the (C) first organic peroxide has a 10-hour half-life temperature that is less than or equal to 110.0° C. and/or a 1-hour half-life temperature that is less than or equal to 130.0° C.; (ii) the (C) first organic peroxide has a 10-hour half-life temperature that is greater than 110.0° C. to less than or equal to 135° C. and/or a 1-hour half-life temperature that is greater than 130.0° C. to less than or equal to 155° C.; (iii) the (D) second organic peroxide has a 10-hour half-life temperature that is less than or equal to 110.0° C. and/or a 1-hour half-life temperature that is less than or equal to 130.0° C.; (iv) the (D) second organic peroxide has a 10-hour half-life temperature that is greater than 110.0° C. and/or a 1-hour half-life temperature that is greater than 130.0° C.; (v) both (i) and (iii); (vi) both (i) and (iv); (vii) both (ii) and (iii); (viii) both (ii) and (iv); (ix) the 1-hour half-life temperature of the (C) first organic peroxide is at least 11° C. higher than the 1-hour half-life temperature of the (D) second organic peroxide; (x) the 10-hour half-life temperature of the (C) first organic peroxide is at least 11° C. higher than the 10-hour half-life temperature of the (D) second organic peroxide; (xi) the 10-hour half-life temperature of the (C) first organic peroxide is from greater than 110.0° to 120° C.; (xii) the 1-hour half-life temperature of the (C) first organic peroxide is from greater than 130.0° to 140° C.; (xiii) both (xi) and (xii); (xiv) the (C) first organic peroxide is dicumyl peroxide; (xv) the (C) first organic peroxide is 2,5-dimethyl-2,5-di(tert-butylperoxy)hexane; (xvi) the 10-hour half-life temperature of the (D) second organic peroxide is from greater than 110.0° to 120° C.; (xvii) the 1-hour half-life temperature of the (D) second organic peroxide is from greater than 130.0° to 140° C.; (xviii) both (xvi) and (xvii); (xix) the (D) second organic peroxide is dicumyl peroxide; (xix) both (xiv) and (xix); (xx) both (xv) and (xix).

8. The method of claim 1 wherein the polyolefin formulation further comprises at least one additive selected from: from 0.05 to <2.0 wt % of (E) an alkenyl-functional coagent; from 0.05 to <2.0 wt % of (F) a tree retardant; from 0.05 to <2.0 wt % of (G) a hindered amine stabilizer; and from 0.05 to <10.0 wt % of (H) a calcined clay filler; with the proviso that the total amount of the polyolefin formulation is 100 wt %.

* * * * *